Figure 1:
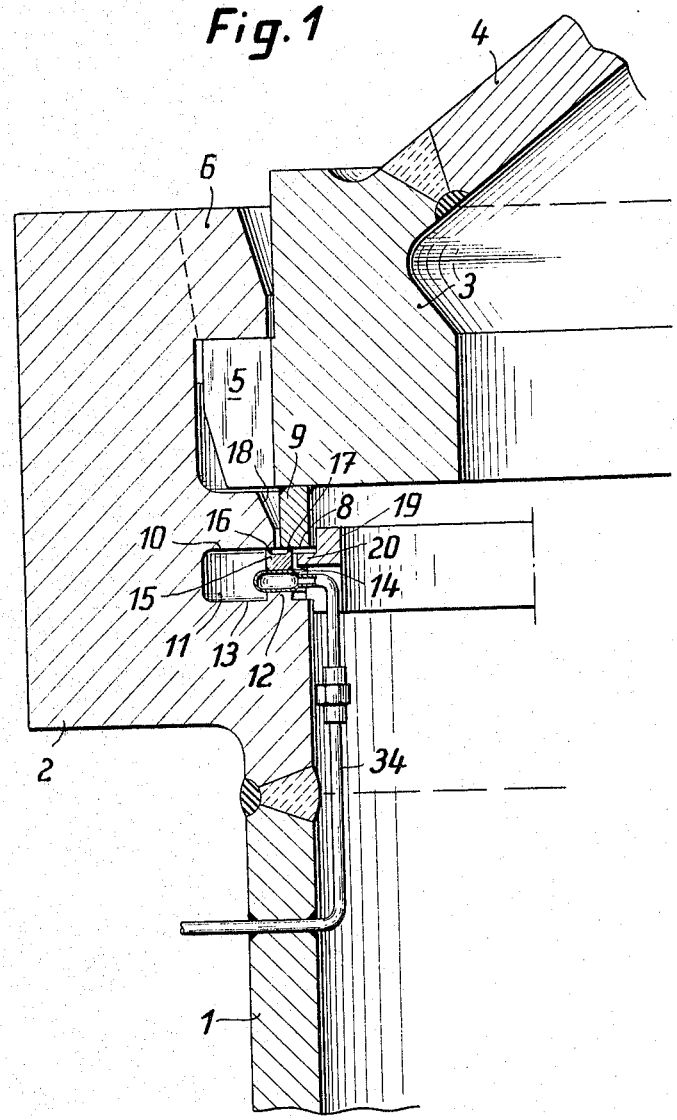

Oct. 4, 1966 G. SCHOLZ 3,276,619
PRESSURE VESSEL SEAL
Filed Dec. 22, 1964 5 Sheets-Sheet 1

INVENTOR.
Günter Scholz
BY
Beaman & Beaman
attys

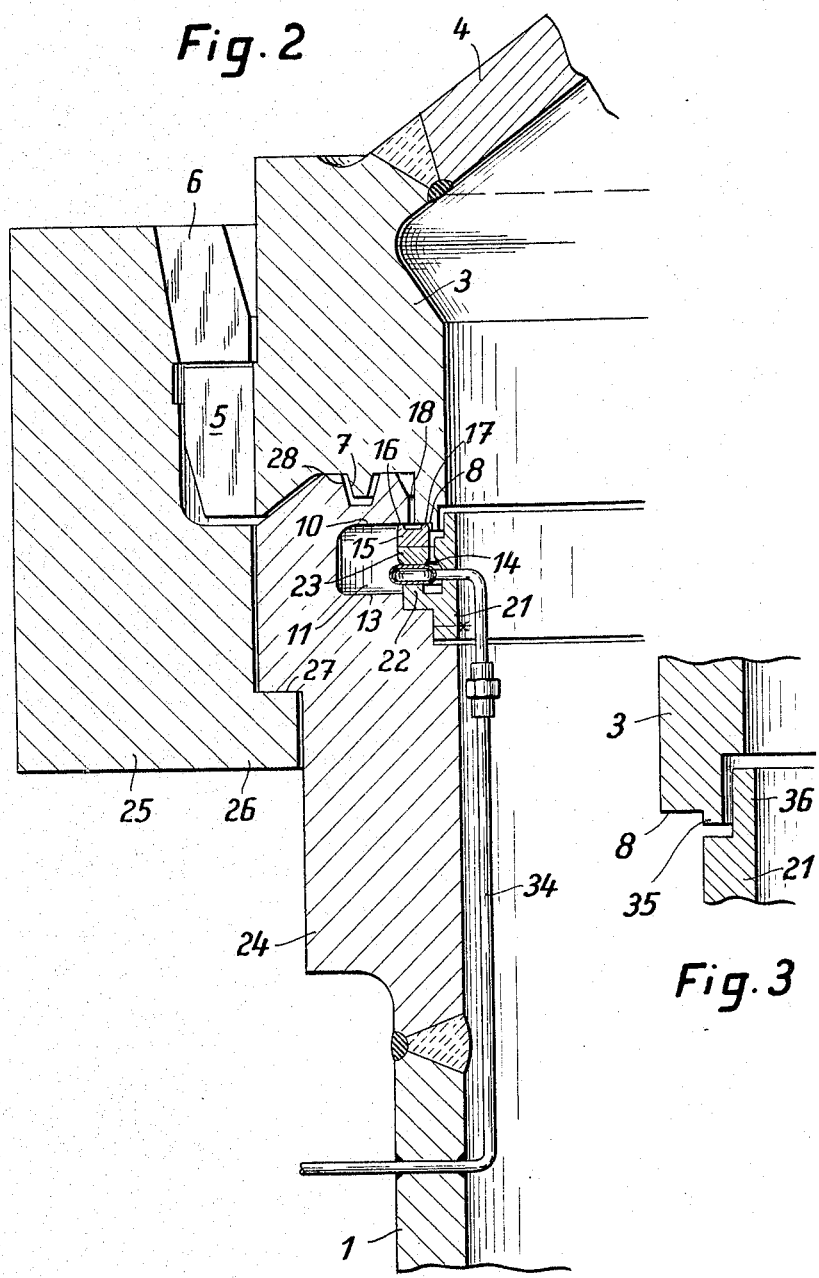

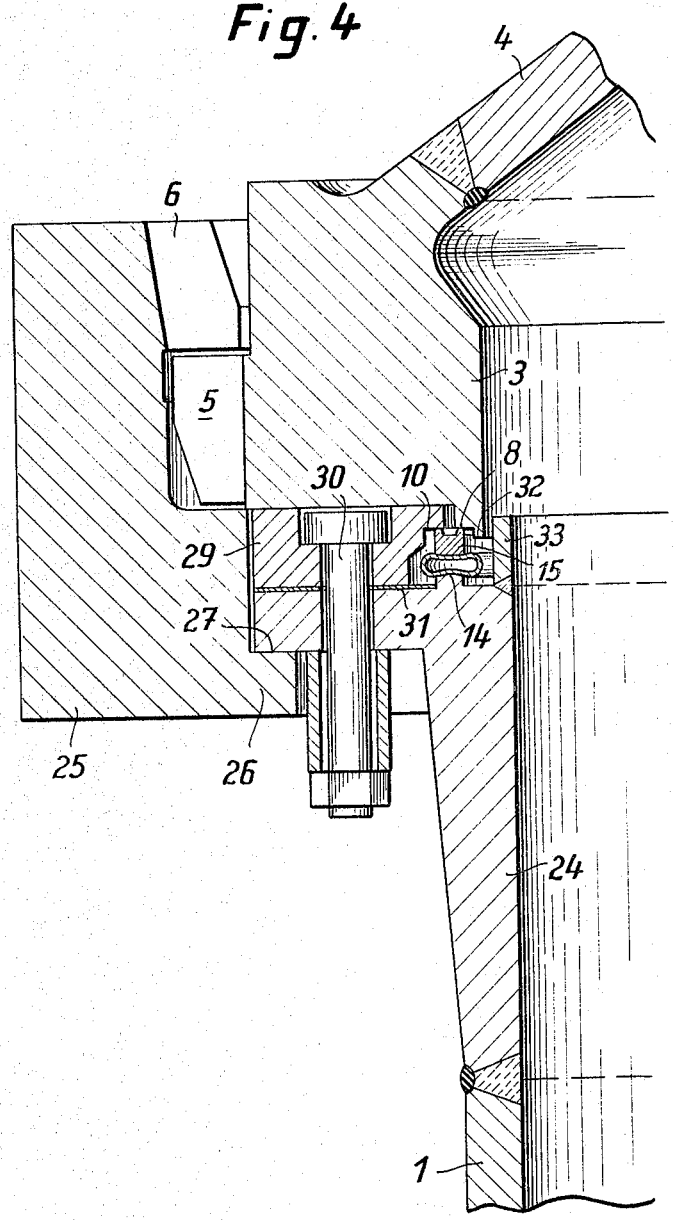

Oct. 4, 1966 G. SCHOLZ 3,276,619
PRESSURE VESSEL SEAL
Filed Dec. 22, 1964 5 Sheets-Sheet 4

INVENTOR.
Günter Scholz
BY
Beaman & Beaman
atty.

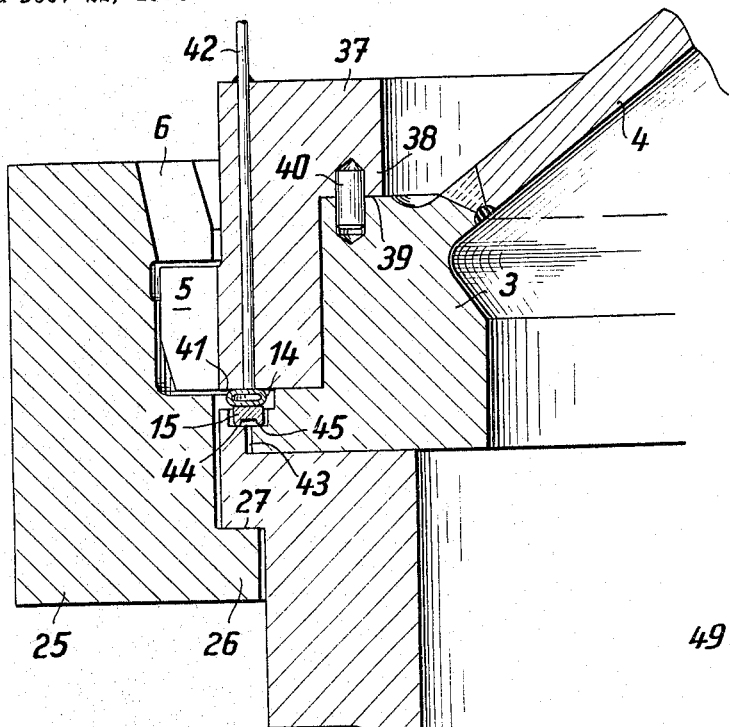
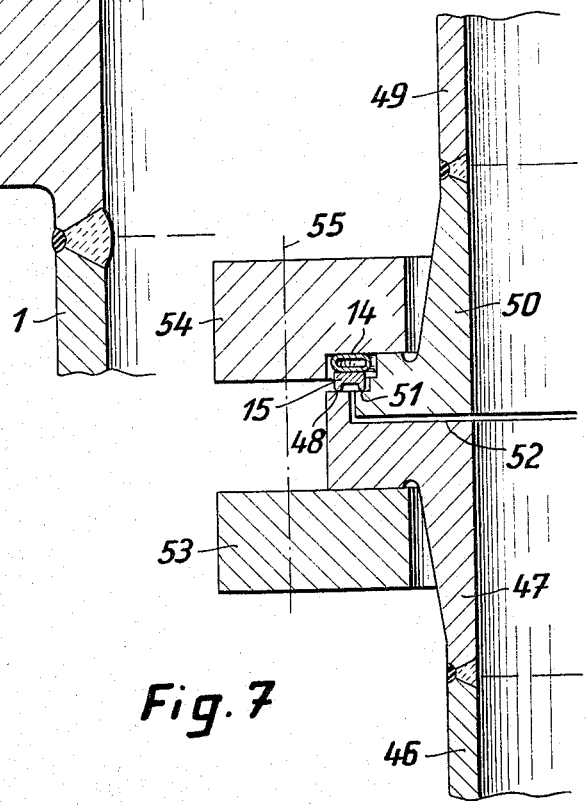

United States Patent Office 3,276,619
Patented Oct. 4, 1966

3,276,619
PRESSURE VESSEL SEAL
Günter Scholz, Coesfeld, Westphalia, Germany
Filed Dec. 22, 1964, Ser. No. 420,326
Claims priority, application Germany, Dec. 23, 1963,
Sch 34,371
4 Claims. (Cl. 220—46)

The invention relates to a device for sealing the detachable closure of pressure vessels, pipelines or fixtures, more especially the lid of a rapid-action closure for pressure vessels, preferably for sealing against high temperatures associated with an overpressure or an underpressure.

By a rapid-action closure a device is meant in which, for closing purposes, the lid is provided with a plurality of tabs distributed equally around its circumference, while the vessel's flange is provided with an identical number of reciprocal tabs. Tabs and reciprocal tabs are arranged on the same diameter. When the lid tabs lie beneath the reciprocal tabs of the vessel the vessel is closed. When the lid is turned in relation to the vessel the lid tabs are rotated away from the area of the reciprocal tabs on the vessel flange, whereupon the lid can be opened.

The rubber or asbestos rings which are frequently employed to seal the detachable closures of pressure vessels, pipelines or fixtures have proved themselves effective in the presence of high pressures. They can also be successfully used for sealing in the presence of moderately heated media, in which case the normal limit can be assumed to be a temperature of from 200 to 250° C. Above this limit, however, seals effected with the aid of such rubber or asbestos rings meet with difficulties. The same is true of cases in which for these rings use is made of plastic synthetics such as Teflon or copolymers of vinylidene fluoride and hexafluoropropylene.

The invention has faced the problem of creating a device for sealing the detachable closure of pressure vessels, pipelines or fixtures, more especially the lid of a rapid-action closure for pressure vessels which acts as a dependable seal in the presence of high temperatures as well.

According to the invention the problem is solved in that the annular crack between closure and vessel, pipeline or fixture is bounded by two sealing surfaces arranged respectively on the closure and the vessel, pipeline or fixture, against which sealing surfaces there rest the annular sealing ridges of a continuous sealing ring, consisting of metal or of a metal-like material, in that the sealing ring on its side opposite to the sealing ridges is supported upon an annular metal tube which, before the closure has been fully sealed, has been flattened from its originally circular section into a section in which its width is greater than its height, and in that, so as to press the sealing ridges of the sealing ring against the sealing surfaces of the vessel, pipeline or fixture and the closure, the inside of the metal tube after its installation is pressurized by employing an internal overpressure in the direction of the sealing surfaces, the position of both sealing surfaces in relation to each other being such that the force exerted in one direction by the metal tube on the sealing ring leads to equally large and similarly directed resulting forces in the sealing ridges which each have one component that runs perpendicularly to their appropriate sealing surface.

According to the invention, therefore, the sealing ridges of the sealing ring, which consists of metal or of a metal-like material, are pressed in the same direction, on the one hand against the sealing surfaces of the closure and on the other hand against the sealing surface of the pressure vessel, the pipeline or the fixture. An essential part of the invention itself reposes in this idea. Were one, however, to desire to put this idea into practice by means of a multiplicity of pistons that are distributed around the circumference and are hydraulically actuated or mechanically attracted, then one would arrive at an extremely uneconomic device in practice scarcely or not at all feasible.

According to the invention, instead of this device, use is made of an annular metal tube pressing the sealing ridges of the ring against the two sealing surfaces that are parallel to each other, said tube being deformed, before the lid has been made tight, from its original circular section into a flattened section. The employment of this flattened metal tube, which is to be pressurized, therefore has a close relationship with the basic idea of the invention, namely to put the two sealing surfaces under a sealing pressure in the same direction by means of the two sealing ridges of the sealing ring, which consists of metal or of a metal-like material. Through subjecting the inside of the metal tube to the overpressure of a fluid medium the sealing ridges of the sealing ring are pressed tightly against the sealing surfaces of lid and vessel. In this manner there result distinct advantages vis-a-vis known sealing devices. A main advantage of the object of the invention consists in the fact that with its aid dependable seals can be arrived at even in the presence of high temperatures. Both the sealing ring, made of metal, and the metal hose can be made of materials that are to a large extent resistant to heat. Pressure inside the hose can be engendered with the aid of any fluid medium. This pressure is most simply arrived at with the aid of air or water. For the circuit connected to the metal tube however, there must be provided a safety valve ensuring that the pressure inside the tube does not attain values which might lead to damage in or even destruction of the tube.

Further measures in connection with the pressurization of the metal tube are discussed below.

For subjecting the metal tube to a pressurized fluid medium only high pressures are envisaged, in order to ensure that the sealing ridges of the sealing ring, consisting of metal or of metal-like material, are squeezed with adequate pressure against the appropriate sealing surfaces. It is quite possible in this case to use pressures of 100 atmospheres gauge pressure or of several hundred atmospheres. The creation of such high pressure is, however, quite feasible in view of the small amounts of fluid medium required at any time, for instance, employing a manually operated hydraulic pump using water as the fluid medium.

Even if initially a small sealing pressure should be applied inside the flattened metal tube, so that as yet no effective seal between sealing ridges and sealing surfaces can be obtained, it is possible without further action to produce an effective seal inside the metal tube by a supplementary raising of the pressure. It should in particular be pointed out that in this instance the de-pressurization of the vessel (namely at a time when the sealing ridges are not yet sealing effectively vis-a-vis the sealing surfaces) in the case of the invention practically never leads to the destruction of the sealing ring or the metal tube.

Should damage occur at any spot to the sealing ridges on the sealing ring, these sealing ridges an be repaired with any of several materials, the spots being mended and cleanly finished off, for example, with the aid of a copper weld or the like.

To carry the invention into effect all that is basically required for installation is a flattened state of the metal tube, in order to lead up the squeezing process and the way to pressing the sealing ridge of the sealing ring against the sealing surfaces of vessel and lid.

In a preferred embodiment of the invention the flattening of the metal tube occurs to the extent that it remains permanently deformed along its two margins that have undergone the most deformation. The material for the metal tube must accordingly possess both pronounced tensile strength and a pronounced ability to stretch. In this connection it is recommended that the metal tube be manufactured out of a special or refined steel alloy. Such special or refined steels are produced by smelting normal steel in Siemens-Martin, crucible or electric furnaces with the addition of alloy constituents, more especially nickel, manganese, chrome and the like.

The stress-strain and expansion diagram for corrosion-resistant special or refined steels is characterized in that, when the yield point is not pronounced, tensile strength rises with increasing expansion to the breaking point generally speaking more or less proportionately. A refined steel tube of 16–20 mm. diameter and with a thickness of wall of about 1 mm. has, for instance, proved itself of service in practice.

Such a tube is first flattened in such a manner that the yield point of its material, especially along the two margins, is exceeded, so that the tube remains flattish or is resilient to only a minor degree.

The sealing surfaces of the vessel ring and of the lid are made as hard as possible and should if possible be ground smooth and polished. When the lid flange and the vessel ring are being manufactured from normal carbon steel the sealing surfaces may, for example, be welded electrically with a non-wearing electrode, after which the surfaces are specially ground.

This kind of surface, when damaged, can be easily repaired. In this event it should be borne in mind that the sealing surfaces may even undulate. They need only be smooth to the extent that any irregularities present gradually merge into each other. Work can accordingly be finished on a damaged sealing surface with wavy irregularities present. Both sealing ring and also flattened metal tube certainly have the capacity to adapt themselves to such irregularities.

In a corresponding manner no difficulties are experienced from the fact that in practice the two sealing surfaces do not lie precisely in a single plane but are displaced in relation to each other by a small amount, in practice, for instance, 0.5 mm., as a result of differences in temperature, compressive stresses and so on. These differences are accepted without difficulty by the sealing ring and also the flattened metal tube.

In a preferred embodiment of the invention the two sealing surfaces lie parallel to each other, in one plane or displaced in relation to each other, the force exerted in one direction by the metal tube on the sealing ring working with equally large and similarly directed perpendicular component forces on the two sealing surfaces. The invention may nevertheless be carried out in such a manner that the two sealing surfaces are at an angle, more especially at right angles, to each other. Then the force exerted by the metal tube on the sealing ring will essentially bisect the angle between the two sealing surfaces.

The sealing ring should maintain its shape and preferably consists of soft metal that may be plastically deformed, more especially soft iron, copper or aluminum. Metal-like substances can also be used for the sealing ring, so long as they can withstand considerable temperatures and possess adequate stability at such temperatures.

When the flattened metal tube is pressurized or compressed, the sealing ring is accordingly pressed against the sealing surfaces of lid and vessel. The pressures now arising in the area of the sealing ridges are so great that the material starts to fuse and an internal combination of the two sealing ridges with the sealing surfaces thus ensues. It is accordingly possible to load the interior of the metal tube with a pressurized fluid medium only until a seal between sealing ridges of the sealing ring and sealing surfaces of vessel and lid is obtained that is effective against the medium inside the vessel; afterwards the inside of the metal tube can be relieved of pressure provided the metal tube communicates with the interior of the pressurized vessel, pipeline or fixture.

In order, however, to extend the life of the metal tube and to avoid its being under zero internal pressure during operation and so having its exterior put under strain by the pressure in the vessel, it is practical during operation to pressurize the inside of the metal tube to a pressure roughly equal to that inside the vessel. For this purpose the medium inside the vessel may be employed.

In one embodiment of the invention the metal tube is arranged in a space connected to the interior of the vessel, pipeline or fixture. If this space should then be subject to overpressure after the sealing of the sealing surfaces has been secured with the aid of the sealing ridges on the sealing ring by admitting pressure to the metal tube, then this space achieves a self-seal which is no longer dependent upon the metal tube being charged by some pressure. Supposing, therefore, that the metal tube should completely fail as a device for exerting pressure on the sealing ring, for example because of fracture, then the whole charge contained in the vessel can be treated to completion without the vessel losing its hermetic quality.

According to the invention an annular space is also provided in that part (vessel or lid) that bounds on the outside the crack in the ring communicating with the open air; said space encloses the sealing ring and the metal tube on the outside and into it the metal tube and/or the sealing ring are partially movable. In this manner during installation the sealing ring and the metal tube by previous gentle squeezing out of a circular form can be shifted away from the axis of the vessel, so as to facilitate installation. For this procedure it is recommended that the sealing ring and/or the metal tube should be deflected from their plane.

It is furthermore recommend that the metal tube and the sealing ring should be isolated from the inside of the vessel by a ring in several parts lightly attached to the vessel. This ring also serves exactly to centre the sealing ring and metal tube, to protect both units and to remove the axial play required at the time of installation.

It may also be practical, if not indeed essential, under certain circumstances to execute the design in such a way that the sealing ring and the flattened metal tube can be installed with axes parallel. This is particularly valid in the case of quite small diameters in which a deformation of the sealing ring and the metal tube is no longer possible even with regard to small areas. In such cases it is recommended that on that part (vessel or lid) which bounds on the outside of the crack in the ring communicating with the open air there should be an auxiliary ring, detachable and tightly fastened, which encloses the sealing ring and metal tube on the outside and which, after removal, permits the installation of sealing ring and metal tube with axes parallel. In order to avoid damaging the sealing ridges while turning the lid at the time of opening and closing, for example, a rapid-action closure, it is recommended that the tabs of the rapid-action closure fastened to the lid should co-operate in an already known manner with the reciprocal tabs of an outside ring which is connected to the vessel in such a way as to revolve but to be axially unmovable.

It can, however, also be recommended that the metal tube should be arranged in a space communicating with the outside. In this arrangement the guide ring can be entirely omitted. Even when effecting a seal against a vacuum and high temperatures such an arrangement has advantages.

To pressurize the metal tube water can, in principle, be used. At high temperatures, however, this is dangerous because water, for example at 500 atmospheres, has a residue of air with a volume of 1/500. Even when there is a rise in temperature to about 125° C. water expands by 10%, and since water is in practice incompressible the pressure inside the metal tube would rise uncontrollably.

At the critical temperature of 374° C. the volume of water increases three times, for example. If a safety valve is employed even this phenomenon is not basically objectionable; nevertheless the safety valve has to be so arranged and of such size that the rapid increase in volume that ensues when there is a rise in temperature from 370 to 374° C. can be disposed of with sufficient speed and safety. From this it will be observed that if water alone be used to pressurize the metal tube a certain caution is requisite in the event of the water being subjected to considerable temperatures.

It may be recommended that instead of water another liquid be employed, the increase in the volume of which is as small as possible when the temperature rises. For this purpose naphthalene is, for example, suitable, since, with its boiling point of 184° C., at a critical pressure of 40 atmospheres it has a critical temperature of 425° C. Recourse may also be had to diphyl, an azeotropic mixture of diphenyl and diphenyl oxide.

The employment of gases, for instance air, instead of any liquids, is by contrast not attended by any dangers. The pressurization of gases to particularly elevated pressures, for instance 500 atmospheres, is, however, more difficult than the pressurization of liquids, for instance water, to a corresponding pressure.

It may, however, be recommended that only after a suitable seal has been installed should the metal tube be pressurized by means of a particularly high pressure, for instance 500 atmospheres, and that then, during operation, a considerably decreased pressure, for instance 50–150 atmospheres, should be employed. In such an event it may be recommended that the high pressure be initially brought about with water in a cold state, said water being then completely removed. During operation, that is, when higher temperatures are occurring during pressurization, the metal tube should, however, be pressurized by gas, more especially air.

The dangers connected with the employment of a liquid, more especially water, are lessened if heated water is used for pressurization.

In order to lessen these dangers, it is also possible to pressurize the metal tube first with a gas, for instance air at 50 atmospheres, and then later fill it with water. Pressure can then be raised with the increasing temperature of the water.

Air at, for instance, 500 atmospheres may be produced directly or by way of a differential piston. If the sealing surfaces are to be ground and polished, in a majority of cases such a high pressure will not be required. It will then very often be adequate to pressurize the metal tube with a gas at a lower pressure, for instance 50 atmospheres, this then increasing during heating, for example to 400° C., to a higher pressure, for example 125 atmospheres, during operation.

Insofar as is possible, the sliding of the sealing ring ridges along the sealing surfaces should be avoided, since when loadings on the ridges are high such sliding may be accompanied by a degree of wear. In this context it may be recommended that the sealing surfaces should be rubbed with a heat-resistant lubricant, for example graphite. It may further be recommended that the sealing ridges be fixed radially in one direction, one sealing surface being, for example, provided with a corresponding projection.

For the rest, the invention is not limited to rapid-action closures for sealing pressure vessels, but can also be employed for screw-down closures and quite generally to seal closures of pressure or vacuum vessels, pipelines and fixtures.

Figure 5:
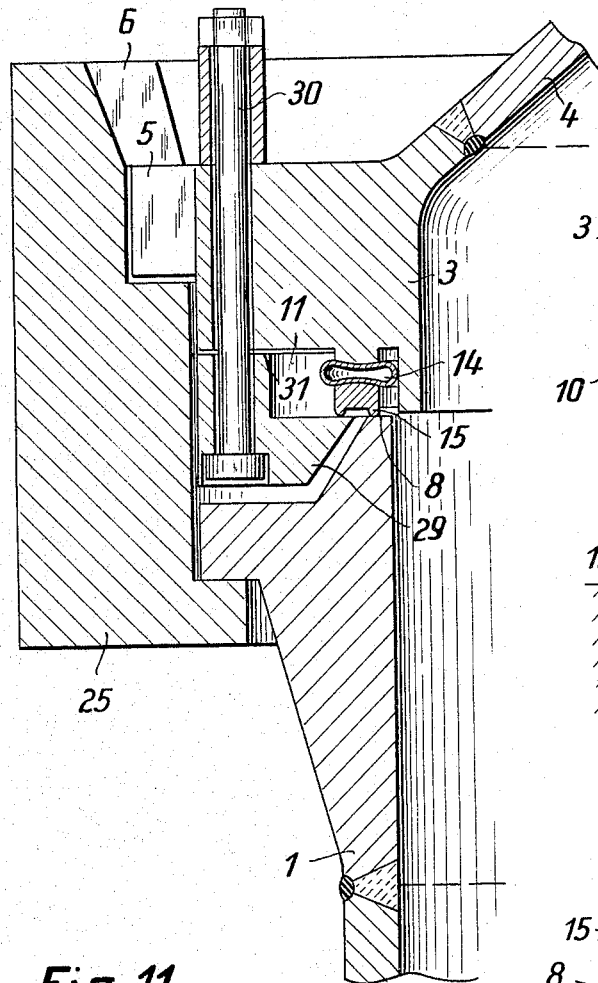
Figure 8:
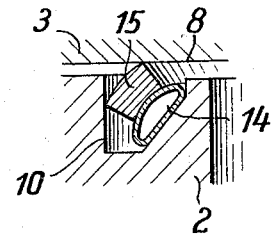
Figure 9:
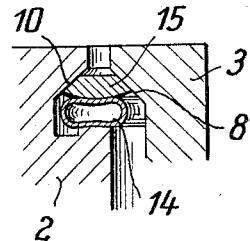
Figure 10:
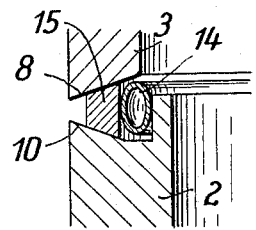
Figure 11:
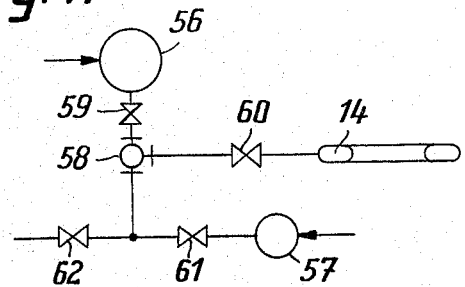

The invention is explained by means of the annexed drawings, in which some embodiments of the invention are shown in simplified form. The drawings show:

FIG. 1, a partial section through the vessel ring and the lid flange of a sealing device formed according to the invention;

FIG. 2, a section similar to FIG. 1 through a somewhat altered embodiment of the sealing device;

FIG. 3, a section on a larger scale through a portion of the embodiment according to FIG. 2;

FIG. 4, a section similar to that of FIGS. 1 and 2 through another embodiment of the invention;

FIG. 5, a section similar to that of FIGS. 1–2 and 4 through yet another embodiment of the invention;

FIG. 6, a section through a further embodiment of the invention;

FIG. 7, a section through another embodiment of the invention;

FIGS. 8–10, schematic partial sections to demonstrate other arrangements of the metal tube and of the sealing ring in relation to the sealing surfaces;

FIG. 11, a diagram of connections to show the admission of pressure to the metal tube.

In all the figures identical or corresponding parts are given the same reference numbers. 1 denotes the cylindrical casing of the vessel onto which a vessel ring 2 is welded. The lid flange bears the reference number 3 and is likewise welded to the lid.

In the example of the embodiment a rapid-action closure is provided. For this purpose the lid flange has a plurality of tabs 5 which, with the lid closed, lie under the reciprocal tabs 6 provided on the vessel ring 2.

The sealing surface of the lid is denoted by 8 and is formed by an annular ridge 9 welded to the lid flange 3.

The sealing surface of the vessel is denoted by 10 and is formed by one wall of an annular chamber 11 provided in the vessel ring 2. When the lid is closed the position of the two sealing surfaces 8, 10 is fixed in relation to each other.

In the closed position the sealing surface 8 of the lid and the sealing surface 10 of the vessel are opposite to each other and in one line.

On a ring-shaped projection 12 of that wall 13 of the annular chamber 11 that is opposite the sealing surface 10 there is a continuous and flattened metal tube 14, more especially made of refined or special steel. Said metal tube is connected by a pipe 34 to an outside pressure-source. Upon the upper side of the flattened metal tube 14 there loosely reposes a continuous sealing ring 15 of a plastically deformable metal or metal-like material, more especially soft iron, copper or aluminum. Said sealing ring has two sealing ridges 16, 17 arranged at a distance from each other, in such a manner that the sealing ridge 16 co-operates with the sealing surface 10 of the vessel and the sealing ridge 17 co-operates with the sealing surface 8 of the lid. Between the two fixed sealing surfaces 8, 10 there is an annular crack 18 communicating with the open air and sealed off by the sealing ring 15. On the vessel near the ring-shaped projection 12 there is fixed (in a manner not shown in greater detail) a ring 19 in several parts and provided with a projection 20 jutting outwards. This ring 19 serves to isolate the flattened metal tube 14 of the sealing ring 15 and of the sealing surfaces 8, 10 from the interior of the vessel. The projection 20 of said ring 19 serves simultaneously to centre the sealing ring in relation to the sealing surfaces. In a corresponding manner the flattened metal tube 14 is also centred by the ring 19.

In a manner described above at length the flattened metal tube 14 is pressurized through the pipe 34 by a high internal pressure, for example a pressure of several hundred atmospheres, with the aid of cold water, in order to press the sealing ridges 16, 17 against the sealing surfaces 8, 10. Afterwards the flattened metal tube 14 can be completely discharged or can be loaded with a lesser pressure, for instance that of the interior of the vessel.

According to FIG. 2 there is provided a ring 21 in several parts and fastened to the vessel, said ring having an annular platform 22 upon which the flattened metal tube 14 reposes. Besides this, there is interposed between the flattened metal tube 14 and the sealing ring 15 a reinforcement ring 23 for relieving the sealing ring 15. Finally, in this case the vessel ring 24 is formed somewhat differently from the vessel ring 2 of the embodiment according to FIG. 1. The reciprocal tabs 6 are here not provided directly on the vessel ring but in a known manner on an outside ring 25, which rests with one flange 26 against a corresponding surface 27 of the vessel ring. The opening of the rapid-action closure ensues in this embodiment in such a manner that the outside ring 25 is so turned that the reciprocal tabs 6 are disengaged from the lid tabs 5. In this manner the turning of the lid in relation to the sealing ring 15 is avoided, such a turning action being liable to damage the sealing ring ridges. In this location, for the sake of safety, between lid flange 3 and vessel ring 24 there is provided on the lid flange 3 a retaining catch in the form of a stud 7 which engages in a drilled hole 28 provided on the vessel ring 24.

According to FIG. 3 the sealing surface 8 of the lid flange 3 is provided with an annular raised portion 35, while the ring 21 is raised at 36. The annular margin 35 forms a protection for the sealing surface when, for example, the lid 8 is laid down away from the vessel. The annular surface 36 also increases protection for the sealing surfaces 8, 10, the sealing ring 15 and the metal tube 14.

In the embodiment according to FIG. 4 an auxiliary ring 29 is fastened on the vessel ring 24 by means of a screw connection. For purposes of sealing a sealing ring 31 is inserted. After the auxiliary ring 29 has been removed, the sealing ring 15 and the flattened metal tube 14 can be installed with axes parallel. The sealing surface 10 of the vessel is here provided on the auxiliary ring 29. For the rest, the lid flange 3 and the vessel ring 24 are provided with additional annular margins 32, 33, in order to isolate sealing ring 15, metal tube 14 and sealing surfaces 10 and 8 from the inside of the vessel.

To carry out the invention it is not absolutely essential that the fixed sealing surfaces 8, 10 should lie in one line. They can also be arranged with a displacement between them: in that case too it is possible to press the sealing ring against these two fixed sealing surfaces in the same direction.

FIG. 5 shows an embodiment in which the sealing ring 15 is arranged with the metal tube 14 within the lid flange 3. In this embodiment an auxiliary ring 29 is fastened by means of a screw connection 30 to the lid flange 3 with the interposition of a sealing ring 31. For the rest, the figure itself does not require a more detailed explanation.

In the diagrams of FIGS. 4 and 5 the pipes for pressurizing the metal tube 14 are not shown.

For the rest, the metal tube 14 in the embodiments according to FIGS. 1–5 is arranged in a space which is connected to the inside of the pressure vessel or to the pressure-transferring space within the pipeline or the fixture. For the sake of safety there are provided, in addition, special drilled holes (not shown) in order to connect the annular space 11 with the inside of the pressure vessel or pipeline.

FIGS. 5 and 6, on the other hand, show two embodiments in which the metal tube is arranged in a space which is connected to the exterior, and FIG. 6 in particular shows a pressure vessel of this kind, while FIG. 7 shows a pipeline provided with a detachable closure of this type.

According to FIG. 6 an auxiliary flange 37 is provided which bears tabs 5 and rests with its flange 38 against a corresponding flange surface 39 of the lid. The auxiliary flange 37 is secured against turning in relation to the lid flange 3 by means of a stud 40. The metal tube 14, which rests against a surface 41 of the auxiliary flange, is fed by way of a schematically represented pipe 42 for the pressurized fluid medium. The annular crack 43 is here connected to the inside of the vessel and is sealed by sealing ring 15. The sealing surface of the vessel has the reference number 44, the sealing surface of the lid the reference number 45. The position of the sealing surfaces 44, 45 are again fixed in relation to each other.

The embodiment according to FIG. 6 does not require a guide ring in several parts. The installation and withdrawal of sealing ring 15 and metal tube 14 is very simple, since the auxiliary flange 37 must not be screwed home but merely secured against turning. The embodiment according to FIG. 6 promises especial advantages for a quite small diameter; but it may be employed also in the case of larger diameters, especially when a series of connections are envisaged by which the bursting of the metal tube can with assurance be obviated. For sealing against a vacuum the embodiment according to FIG. 6 also has particular advantages. The sealing ring 15 of this embodiment can be designed to be specially flat, so that it lies with the whole of its breadth along the metal tube 14. In the case of a smaller diameter there can therefore be easier turning, hence an easier assimilation to peak differences occurring through the action of heat and pressure. The pressure-transferring pipe 14 does through the hinge of the lid or is arranged to be so loose and amply proportioned that the pipe follows every movement of the lid.

The pipeline according to FIG. 7 has one pipe end 46 with a flange 47 provided with a sealing surface 48. The other pipe end 49 has a fixed flange 50 with a sealing surface 51. The position of the two sealing surfaces 48, 51 in relation to each other is fixed. The crack 52 between the two sealing surfaces is connected to the inside of the pipeline and is closed off by the sealing ring 15, which is pressed against the sealing surfaces by means of the metal tube 14. The pipe for bringing in the pressurized fluid medium to the metal tube is not shown in particular. The two pipe ends are held together by means of loose flanges 53, 54 with the aid of screws 55, which should not be secured too tightly.

A further advantage of the invention, not previously mentioned, consists in the fact that the closure can also easily be directed downwards without there being danger of the sealing ring dropping out.

In the embodiments according to FIGS. 6–7 the metal tube and sealing ring may be particularly easily fabricated. These embodiments are also suitable for smaller diameters.

In FIGS. 8–10 there are shown some altered embodiments in which the two fixed sealing surfaces lie at an angle to each other. The position of the two sealing surfaces in relation to each other must in this case too be such that the force exerted in one direction by the metal tube on the sealing ring leads to equally large and similarly directed resulting forces in the sealing ridges, which each have a component that runs perpendicular to the appropriate sealing surface.

In the diagram of connections in FIG. 11 the metal tube is again denoted by 14, while an air compressor is numbered 56 and a pump to pressurize the water is numbered 57. By means of a three-way cock 58 the metal tube 14 can be connected either with the compressor 56 or with the pump 57. Instead of the three-way cock another isolating device may be used, the piping from which can be inter-dependently so controlled that only one pipe or the other can be opened. In the piping there is supplementary provision for isolating valves 59, 60, 61. By way of one pipe provided with an isolating valve 62 the system of piping is given access to the outside air. The safety valve for the metal tube 14 is not shown in particular. With the aid of such a system of connections the inside of the metal tube 14 can be pressurized as follows:

(1) Pure hydraulic pressure (for instance, with the metal tube cold, at a pressure of 500 atmosphere);

(2) Pure pneumatic pressure (with a pressure of 50 atmospheres, for example);

(3) Pure pneumatic pressure (with a pressure of 50 atmospheres, the metal tube being so heated by the medium that is to be sealed off that a higher internal pressure of 125 atmospheres, for example, results);

(4) The metal tube is first pressurized with an air pressure of 50 atmospheres, whereupon a further increase in pressure is effected by the introduction of water;

(5) An increase in pressure by means of air at, for example, 50 atmospheres which is brought up to a pressure of 125 atmospheres, for example by heating, whereupon a further increase in pressure is effected by the introduction of water.

What I claim is:

1. High pressure sealing apparatus for sealingly interconnecting detachable first and second members comprising, in combination, first and second members having coaxial axes, at least one of said members being hollow and adapted to be internally subjected to high pressures, interlocking means detachably interlocking said members together selectively preventing relative axial displacement, an annular, axially extending joint defined between said members having an open end, a first radial sealing surface defined on said first member adjacent said open end of said joint, a second radial sealing surface defined on said second member adjacent said joint open end and in substantial axial alignment with said first sealing surface and radially spaced therefrom, an annular radial backing surface defined on one of said members in radially opposed relation to said joint open end and axially spaced therefrom, an annular sealing ring of high strength, high temperature resistant material radially spanning said joint open end and engaging said first and second sealing surfaces, an annular, deformable, metallic tube having a flattened cross-sectional configuration interposed between said backing surface and said sealing ring, said tube cross section having its major dimension in the radial direction, whereby the introduction of a pressurized medium into said tube causes said tube to expand in the axial direction and forces said sealing ring into sealing engagement with said sealing surfaces, and means for pressurizing said tube.

2. Sealing apparatus, as in claim 1, wherein said joint communicates with the atmosphere surrounding said members and said sealing ring and tube are externally subjected to the high pressure within said one member.

3. Sealing apparatus, as in claim 1, wherein said sealing ring is made of metal and includes first and second annular, radially spaced sealing ridges defined thereon, said first ridge engaging said first sealing surface and said second ridge engaging said second sealing surface, said tube being formed of steel and being originally of a cylindrical cross section and permanently preformed to its flattened configuration.

4. A cylindrical pressure vessel member having a cylindrical opening defined therein, a cylindrical cover member for enclosing said opening, said members having coaxial axes when assembled, interlocking means detachably interlocking said vessel and cover members preventing relative axial displacement, an annular, axially extending joint defined between said members having an open end, a first radial sealing surface defined on said vessel adjacent said open end of said joint, a second radial sealing surface defined on said cover adjacent said joint open end and in substantial axial alignment with said first sealing surface and radially spaced therefrom, an annular, radial backing surface defined on one of said members in radially opposed relation to said joint open end and axially spaced therefrom, an annular sealing ring of high strength, high temperature resistant material radially spanning said joint open end, said sealing ring including first and second annular, radially spaced sealing ridges defined thereon, said first ridge engaging said first sealing surface and said second ridge engaging said second sealing surface, an annular metal tube originally of cylindrical cross section preformed to a flattened cross section wherein the major cross-sectional dimension extends in the radial direction interposed between said backing surface and said sealing ring, whereby introduction of a pressurized medium into said tube causes said tube to expand in the axial direction and forces said sealing ring ridges into sealing engagement with the associated sealing surface, and means for pressurizing said tube.

References Cited by the Examiner

UNITED STATES PATENTS

| | | | |
|---|---|---|---|
| 863,001 | 8/1907 | Seebeck | 220—46 |
| 1,381,958 | 6/1921 | Banks | 220—46 |
| 2,114,381 | 4/1938 | Horner | 220—46 |
| 2,153,674 | 4/1939 | Ommundson | 220—46 |
| 2,226,495 | 12/1940 | Jacocks | 220—46 |
| 2,257,213 | 9/1941 | Wolfrom | 220—46 |
| 2,690,275 | 9/1954 | Alt | 220—46 |
| 2,749,162 | 6/1956 | Humphrey | 220—46 |
| 3,125,928 | 3/1964 | Bartels | 220—46 |
| 3,159,302 | 12/1964 | Latham | 220—46 |

FOREIGN PATENTS

| | | |
|---|---|---|
| 534,814 | 1/1955 | Belgium. |
| 12,334 | 12/1924 | Netherlands. |

THERON E. CONDON, *Primary Examiner.*

GEORGE E. LOWRANCE, *Examiner.*